United States Patent [19]

Schadlich et al.

[11] 4,002,959
[45] Jan. 11, 1977

[54] MOTOR CONTROL SYSTEM, PARTICULARLY TO REDUCE IDLING SPEED

[75] Inventors: Fritz Schadlich, Stetten; Friedrich Hornung, Stuttgart, both of Germany

[73] Assignee: Robert Bosch GmbH, Stuttgart, Germany

[22] Filed: Jan. 28, 1975

[21] Appl. No.: 544,692

[30] Foreign Application Priority Data

Feb. 16, 1974 Germany .......................... 2407601

[52] U.S. Cl. .............................. 318/245; 318/332; 318/345 F; 318/345 G; 318/345 H; 318/459; 318/474

[51] Int. Cl.² ........................................ H02P 7/36

[58] Field of Search .......... 318/245, 332, 345, 434, 318/459, 474, 507

[56] References Cited

UNITED STATES PATENTS

| | | | |
|---|---|---|---|
| 3,292,069 | 12/1966 | Evans, Jr. .................... | 318/245 X |
| 3,331,004 | 7/1967 | Brown ............................... | 318/245 |
| 3,336,517 | 8/1967 | Cain ................................... | 318/332 |
| 3,379,950 | 4/1968 | Friedline ........................... | 318/434 |
| 3,559,019 | 1/1971 | Kato .................................. | 318/345 X |

*Primary Examiner*—Gene Z. Rubinson
*Attorney, Agent, or Firm*—Flynn & Frishauf

[57] ABSTRACT

To reduce noise and idling speed of electric motors, particularly series motors, the speed-torque characteristic of the motor is dropped with respect to the loaded speed-torque characteristic, by sensing no-load operation of the motor and deriving a sensed signal, the sensed signal being applied to controlled switches to abruptly change the effective voltage applied to the motor between values corresponding to the no-load speed-torque characteristic, or the load speed-torque characteristic and resulting in the desired speed, in dependence on the value of the sensed signal. Preferably, the operating condition of the motor is sensed by an inductive transducer, and a speed change is obtained by phase control, or half-wave rectification.

12 Claims, 4 Drawing Figures

MOTOR CONTROL SYSTEM, PARTICULARLY TO REDUCE IDLING SPEED

The present invention relates to a control system for electric motors and more particularly to such a system for use with series motors in which the no-load speed of the motor is reduced to reduce the noise level of operation of the motor as well as energy consumption thereof when not providing useful output.

Various circuits have been provided to decrease the speed of electric motors when operating under no-load conditions, and further to prevent unnecessary high operating speeds when the motor is not loaded. The most important control parameters being affected by these control systems raise the speed-torque characteristic when the motor is being loaded. As the torque required from the motor increases, the operating voltage applied to the motor is likewise increased, so that the speed of the motor is constrained to be essentially constant. Control may be, for example, between two preselected voltages which are constantly either connected, or disconnected, that is, such a control may be an ON-OFF type of control.

The present invention is directed to a problem which is somewhat different from that solved by the various control systems of the prior art, in that the speed of the electric motor, when operating under no-load conditions, should be abruptly dropped by a substantial amount, in order to decrease the noise level of operation of the motor. It is, accordingly, an object of the present invention to provide a motor control system which abruptly drops motor speed when the motor operates under no-load conditions.

SUBJECT MATTER OF THE PRESENT INVENTION

Briefly, no-load operating condition of the motor is sensed by a suitable sensor — for example an inductive transducer — which provides a sensed output signal. The sensed output signal is then applied to a switch which changes over, in dependence on the sensed signal, between two states to abruptly change the effective voltage applied to the motor, under control of the sensed signal. The effective voltage applied to the motor may be changed, for example, by a phase control, or half-wave rectification, or by applying pulses to the motor of predetermined phase relationship.

The system of the present invention can be simply realized by utilizing controlled semiconductor switches for the switch elements; the measuring device or sensing element preferably is a current-voltage transducer to obtain a sensing signal representative of current flowing through the motor.

The motor control system permits abrupt change of speed of the motor to a low minimum operating speed when the motor operates under idle, or no-load conditions, so that the noise level of motor operation is substantially reduced. This is particularly important in high-speed electric tool drives; the no-load or idle speed of these tools is not utilized as such since, for useful work, the motor is loaded. Typical applications are, for example, grinders and rotary saws, which are extremely noisy when operating under no-load conditions, and the noise level of which should be reduced to meet environmental and, in some instances, legal requirements. Reducing the speed of operation of the motors when not loaded, further decreases wear and tear on bearings, gear drives, the electrical rotating and contacting elements such as collectors, brushes, and the like, and additionally decreases the no-load energy consumption of the motor.

The invention will be described by way of example with reference to the accompanying drawings, wherein.

Figure 1:
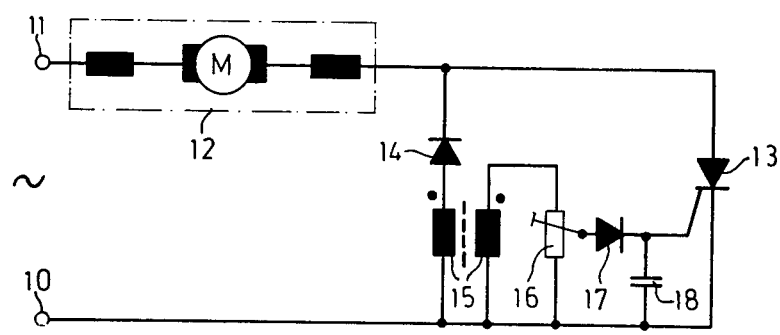
FIG. 1 is a schematic circuit diagram of the present invention.

An a-c supply is connected to terminals 10, 11 (FIG. 1), for example over suitable switches, not shown. Terminals 10, 11 are connected to the series circuit including a universal series motor 12 and the main switching path of a thyristor 13, for example an SCR. A branch circuit is connected in parallel to thyristor 13, which includes the series connection of a diode 14 and the primary winding of an inductive transducer, or transformer 15. The diode 14 and thyristor 13 are poled oppositely to each other. The secondary winding of the transformer 15 is connected to a voltage divider 16, in the form of a potentiometer with a variable slider. The tap or slider point of the voltage divider 16 is connected through a diode 17 to the gate of the thyristor 13; a capacitor 18 connects from the cathode of the diode 17 to the other terminal of the power supply, and to the cathode of the thyristor.

Figure 2:
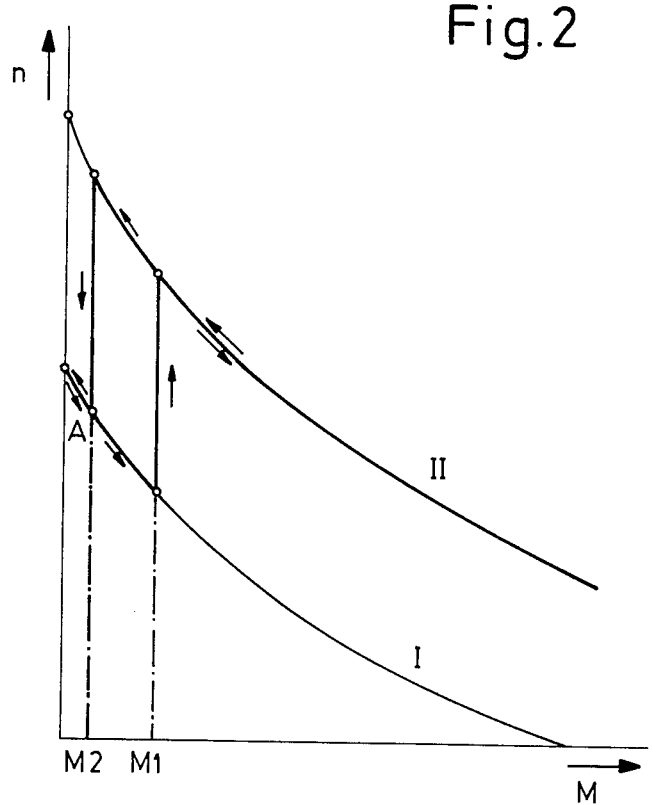
FIG. 2 is a torque (abscissa) vs. speed (ordinate) graph of motor operation, to illustrate the operation of the circuit of FIG. 1.

The operation of the motor can best be understood by considering the diagram of FIG. 2, in which torque M of the motor is shown on the abscissa, and speed n of the motor 12 is illustrated on the ordinate. In a first switching stage I, motor 12 operates at a low voltage, reduced by the control system, resulting in an operating characteristic curve I, FIG. 2. Under no-load condition, the motor will operate in the region A of curve I. Upon loading of the motor, the speed n drops until it reaches a first critical speed corresponding to the torque M1. At this speed, the motor current has risen to such an extent that the control system responds, and switches over to a higher voltage. The motor operating characteristic abruptly changes from curve I to curve II, that is, the motor abruptly increases speed. The supply voltage corresponding to operating curve II corresponds, for all practical effects, to the terminal voltage across terminals 10, 11 (less circuit voltage drops which can be neglected). The abrupt jump in operation between the two curves I, II of course is coupled with increased power being taken from the supply lines by the motor, and power being delivered by the motor. Upon further increase in torque, the motor will operate according to the characteristic curve II, until it reaches blocked rotor state. Upon unloading of the motor, the speed n increases up to a second critical speed corresponding to torque M2. At that point, the operating condition of the motor again reverts from curve II to curve I, and motor 12 will operate, in idle condition, with reduced speed. The switching hysteresis should be broad enough to avoid undesired random back and forth switching changes between the characteristic curves which are not caused by clear changes in loading but which are, rather, triggered by noise or stray irregularities arising due to commutation difficulties, voltage variations at the supply terminals 10, 11, and the like.

Operation of the system of FIG. 1: To change the motor operation between characteristic curves I or II, the thyristor 13 is controlled. Initially, thyristor 13 is blocked, and the motor will operate in accordance with curve I. Diode 14 passes only a half wave of the a-c energy applied to terminals 10, 11. The motor operates at a speed reduced by about 70% with respect to full-wave operation. The thyristor is controlled by the transformer 15 which has the current flowing through diode 14 passing therethrough. The voltage applied to the secondary winding of transformer 15 is highly damped by the presence of the voltage divider 16. It will have a voltage applied thereto which lags that of the primary current by 90°; the voltage will have a maximum following the null of the primary current, and then decay. A portion of this secondary voltage, the value of which depends on the primary current, and hence on motor current, is tapped off the voltage divider 16 to charge the capacitor 18 over diode 17. When the voltage at the capacitor 18 has reached a value sufficient to trigger the thyristor (as determined by the setting of the potentiometer 16), thyristor 13 will fire and the initial half wave passed by diode 14 is completed by thyristor 13 to full wave. The tap or slider of potentiometer 16 is so set that when the current drawn by the motor corresponding to torque M1 is reached, thyristor 13 will fire, causing the motor, abruptly, to change operating characteristic from the curve I to the curve II. As the motor is unloaded, the opposite effect will be obtained when the capacitor voltage on capacitor 18 drops below that necessary to fire thyristor 13.

Figure 3:
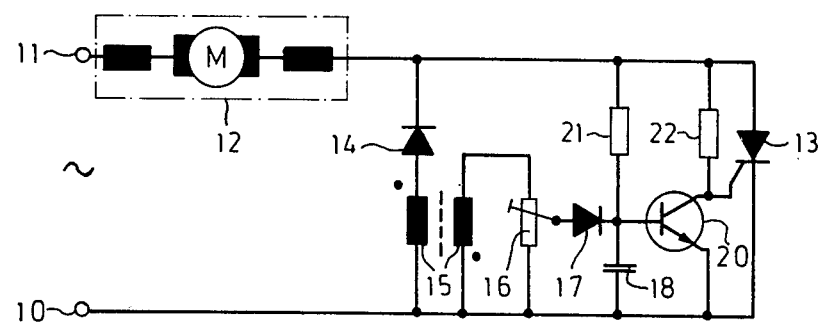
FIG. 3 is a schematic circuit diagram of another embodiment of the present invention.

Embodiment of FIG. 3: The difference between the embodiments of FIGS. 1 and 3, essentially, is that the cathode of the diode 17 is not directly connected to the gate of the thyristor 13, but rather to the base-collector path of a transistor 20. The emitter of transistor 20 is connected to terminal 10; the collector of transistor 20 is connected on the one hand to the gate of the thyristor 13 and on the other over a collector resistor 22 to the anode of the thyristor 13 and through motor 12 to terminal 11. The transformer 15 is reversely polarized with respect to the connection of the transformer 15 in FIG. 1. In all other respects, the circuits are similar.

Operation of circuit of FIG. 3: The different polarity connection of the transformer 16 and the presence of the transistor 20 effect initially blocking of the thyristor 13 since, during the entire half wave during which current flows to diode 14, base resistor 21 holds the transistor in conductive state. Ignition current is, therefore, bypassed through the collector-emitter path of transistor 20. As the motor is loaded, and motor current increases, the anode of diode 17 will have a negative voltage arise thereat, when current in the transformer passes through null or zero, which cancels the blocked state of the transistor for short periods of time, thus permitting the resistor 22 to apply firing current to the gate of thyristor 13. The thyristor, once rendered conductive, of course remains conductive for the respective half wave. This arrangement has the advantage that the inductive transformer can be much smaller since the power to fire the thyristor need not be provided, directly, by the transformer 15. Temperature changes in the base-emitter diode portion of the transistor 20 and of the diode 17 cancel each other, so that the switching points, as they arise on the characteristics of the diagram of FIG. 2, become essentially temperature-independent.

The voltage drop between full-load operation and no-load operation is approximately 30% of full-load voltage, and this drop cannot be changed due to the relationship of effective currents between half-wave and full-wave operation. If a higher degree of voltage drop is desired upon idling, resulting in a still lower idle noise level of the motor, then the voltage drop for idling operation must be in the order of from 50% to 80% of full-load voltage. This change in voltage can be obtained by effecting symmetrical full-wave phase control. Triacs, or anti-parallel connected thyristors and controlled symmetrically by firing pulses can be so controlled that the firing time, or angle, can be selected at any position between 90° and 0° of the wave, to change abruptly, in dependence on motor current. This embodiment is illustrated in connection with FIG. 4.

Terminals 10, 11, in series with the motor 12, are connected to a series circuit including triacs, or anti-parallel connected thyristors 30 and transformer 15. A full-wave rectifier is formed on diode elements 31, 32, 33, 34, and has its a-c diagonal terminals connected over a resistor 36 to the cathode of triac 30 and, directly, to the gate of the triac 30, the other a-c diagonal terminal being connected over a resistor 35 with the anode of the triac 30. Resistor 35, in combination with a further resistor 37, forms a voltage divider which is connected in parallel to the switching path of the triac 30. A smoothing capacitor 38 is connected in parallel to resistor 37. The positive terminal of the rectifier bridge is connected to the anode of a thyristor 39, to a resistor 44, and to a capacitor 40. The negative terminal of the rectifier connects to the cathode of the thyristor 39, to the emitter of a transistor 43 and to the anode of a diode 41, the cathode of which is connected to the other terminal of the capacitor 40. The junction between the cathode of diode 41 and the capacitor 40 is connected through a variable resistor 42 to the base of the transistor 43, so that the series circuit formed by the cathode 41 and resistor 42 bridges the base-emitter path of transistor 43. The collector of transistor 43, as well as the gate of the thyristor 39, are connected to the other terminal of resistor 44.

The secondary winding of inductive transformer 15' has a center tap which is connected to the emitter of transistor 43. The two ends of the secondary of transformer 15' are connected, each, to the cathodes of respective diodes 45, 46, which are further bridged by a variable resistor 47. The anodes of diodes 45, 46 are connected together and to the base of transistor 43, so that the voltage applied between emitter and base of transistor 43 is a full-wave rectified voltage derived from transformer 15'. Resistor 47 functions as a damping resistor.

Figure 4:
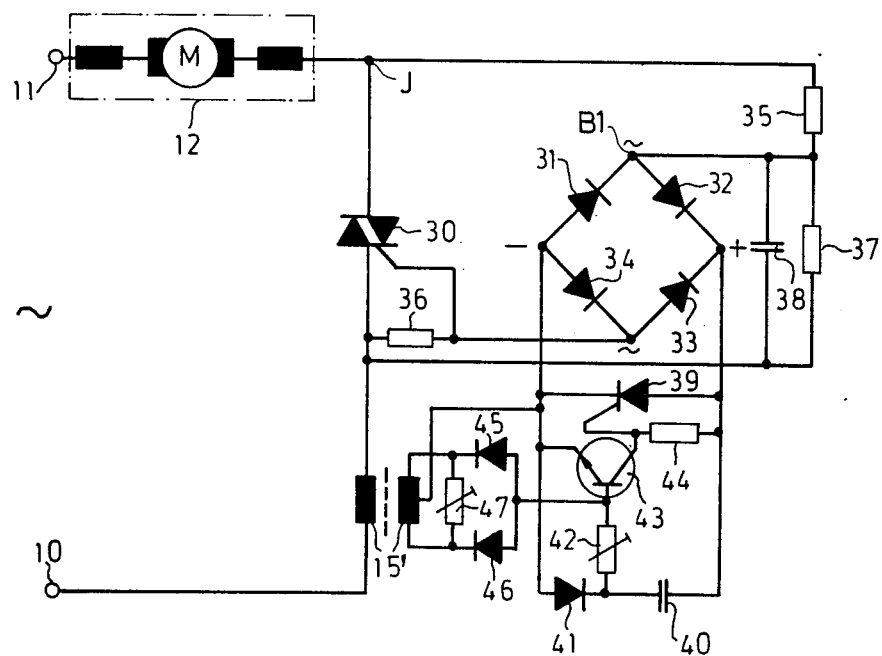
FIG. 4 is a schematic circuit diagram of a third embodiment of the present invention.

Operation of circuit of FIG. 4: In contrast to the half-wave - full-wave power supply to the motor as illustrated in the examples of FIGS. 1 and 3, the motor of FIG. 4 has full-wave phase control. The gate of triac 30 is connected to the rectifier bridge formed of diodes 31–34, and triac 30 will fire when the d-c output of the bridge is short-circuited, that is, when the thyristor 39 is conductive. The thyristor 39 is fired when transistor 43 is in blocked state. When transistor 43 is conductive, any firing current for the thyristor 39 is bypassed over resistor 44 and the collector-emitter path of the transistor 43. Triac 30, therefore, is conductive when the transistor 43 is in blocked state. Phase control of the transistor 43 is obtained by proper timing of the time constant of the R/C combination of resistance and capacitance of resistor 42 and capacitor 40, to hold transistor 43, for a limited time, in conductive state. In non-conductive state of the triac 30 and of the thyristor 39, that is, immediately after the current passed through zero, the next half-wave voltage derived from the power supply will build up between anode and cathode of the thyristor. As a result, a positive current will flow through the base-emitter path of the transistor 43, phase-shifted due to the R/C circuit formed by capacitor 40 and resistor 42. This phase-shifted current is leading, due to the presence of the capacitor 40, and reverses in the time period between the half-wave maximum and the subsequent following null passage of the power current. The exact timing can be set by the adjustable resistor 42. As soon as transistor 43 blocks, triac 30, as above described, becomes conductive. Thyristor 30 also conducts, and diode 41 permits discharge of the capacitor 40, so that the firing angle determined by the setting of resistor 42 is reproducible in each half wave of the power supply. The pass voltages of the diodes 45, 46 are selected to be higher than the base-emitter voltage of the base-emitter diode combination of the transistor 43, so that the base current cannot bypass over diodes 45, 46 and the tap point of the secondary winding of transformer 15 to the negative terminal, or ground. Resistor 36 prevents firing of the triac in the period of time between the null in the ignition timing by bypass currents derived from the elements 40, 42, 43, 44.

The circuit of FIG. 4 provides a fixed phase control (fixed, by the setting of resistor 42) in accordance with operating curve I of FIG. 2. Switch-over of operation from curve I to curve II is obtained when, upon sufficient motor current, the voltage at the anodes of the diodes 45, 46 will have a negative value of such level that base current will flow past the transistor 43 over diode 45, 46 to the secondary winding of the inductive transformer and hence to the negative terminal of the rectifier bridge. By damping the secondary winding by a resistor 47, the pulse from the transformer 15, when the current goes through zero, is broadened. The transistor 43 thus switches shortly after current goes through zero into non-conductive state, causing an immediate firing of triac 30. The motor is then supplied with practically full-wave supply (having hardly any phase control) and the operating characteristic will jump rapidly from the curve I to the curve II.

The phase shift which results from the phase control operation of the circuit of FIG. 4 is dependent on the value or amplitude or level of the half waves of the power supply. This is not usually the case in the customary triggering circuits having a charging capacitor and trigger diodes. The phase angle which depends on power supply voltage conditions, that is, whether the power supply is at nominal level, or above or below nominal level is, however, necessary in order to hold the switching hysteresis within the predetermined narrow limits as shown in FIG. 2.

The elements forming the voltage divider 35, 37 and capacitor 38 could be omitted, and the bridge connection to terminal B1 could be connected to the junction between the triac 30 and the motor 12, indicated as junction J in FIG. 4. The voltage divider 35, 37, however, reduces the voltage applied to the bridge and without the presence of the voltage divider 35, 37, the diodes 31–34 of the bridge would then have to be expensive high-voltage diodes. Capacitor 38 effects smoothing of the voltage applied to the triac, and this smoothing effect would also be omitted so that misfirings could occur, and hence reliability of operation between the characteristics I and II (FIG. 2) could not be ensured, particularly if the motor has poor commutation. The operating reliability of the system would thus be decreased, although a saving in components will also result.

In the examples described, no-load or idle operation condition of the motor is sensed by sensing the current flowing through the motor 12. Other criteria could be selected, for example armature voltage, speed (as transduced by a speed transducer) or torque. These parameters can be sensed by suitable transducers and applied as an electrical control signal over a suitable transformer or transducer element. Other current-voltage sensing devices, such as resistors may, of course, be used rather than the transformer 15. Resistors, although cheaper, result in a decrease in operating efficiency of the motor and its control system.

Various changes and modifications may be made, and features described in connection with any one of the embodiments may be used with any of the other, within the inventive concept.

We claim:

1. Electric motor control systems in which the no-load speed - torque characteristic of the motor is reduced with respect to the load - speed torque characteristic, comprising a transformer (15) connected to sense the current flowing through the motor (12) and deriving a sensed signal;

and controlled switch means (13, 30) connected to and controlled by the measuring means (15) abruptly changing the effective voltage applied to the motor between a value corresponding to no-load speed - torque characteristic and load speed - torque characteristic in dependence on the value of the second signal when the sensed signal from the measuring means reaches a predetermined value.

2. System according to claim 1, wherein the switching means comprises a controlled semiconductor switch (13, 30).

3. System according to claim 1, wherein the switching means comprises a controlled rectifier (13) connected in series with the motor (12);

and a further rectifier (14) is provided, connected to be oppositely poled with respect to the controlled rectifier, the controlled rectifier being selectively controlled to be conductive, or non-conductive, in dependence on the value of the sensed signal.

4. System according to claim 3, wherein the transformer (15) is connected in series with the further rectifier (14).

5. System according to claim 1, wherein the transformer (15) is connected in series with the motor and has at least a portion of the motor current flowing therethrough;

a capacitor (18) being connected to the transformer and charged to a voltage representative of current flow through the motor;

and wherein the controlled switch means comprises a controlled rectifier (13), connected to and controlled by the charge on the capacitor (18).

6. System according to claim 1, wherein a damping resistor (16, 47) is connected in parallel to the secondary of the transformer (15).

7. System according to claim 1, wherein the controlled switching means comprises a controlled semiconductor switch (30);

the transformer (15), the controlled semiconductor switch (30) and the motor (12) being serially connected.

8. System according to claim 7, wherein the semiconductor switch is a triac (30);

a phase angle control circuit, including an R/C circuit (40, 42) is provided, connected to and controlling the phase angle of connection of the triac (30), the R/C circuit controlling the extent of phase angle connection, and the measuring means selectively connecting the phase angle control circuit when sensing that the motor is operating under no-load conditions to effect control of the phase angle of connection of the triac (30), as determined by the R/C circuit (40, 42) and to reduce the no-load speed of the motor.

9. System according to claim 8, further comprising a bridge rectifier (31–34) having at least a portion of the voltage across the main switching path of the triac (30) applied thereto;

a controlled rectifier (39) and a switching transistor (43) being provided, the d-c output from the bridge rectifier being connected across the main switching path of the controlled rectifier (39) and to a circuit including the R/C circuit (40,42) and the base-emitter path of the switching transistor (43), the emitter-collector circuit of the switching transistor (43) controlling conduction of the controlled rectifier, the base of the switching transistor being connected to have said sensing signal applied thereto to selectively, connect the d-c output of the bridge rectifier to the R/C circuit.

10. System according to claim 8, wherein the transformer (15) is connected to the phase control circuit to inhibit connection of the phase control circuit to the controlled rectifier when the current through the motor (12) exceeds a predetermined value.

11. System according to claim 10, wherein a full-wave rectifier (45, 46) (15) connected to the secondary thereof, the output of the full-wave rectifier forming said sensing signal.

12. System according to claim 9, further comprising a voltage divider (35, 37) connected across the triac (30) and providing a reduced voltage to said bridge (31–34);

and a smoothing capacitor (38) connected across at least that portion of the voltage divider across which the bridge is connected.

* * * * *

UNITED STATES PATENT AND TRADEMARK OFFICE
CERTIFICATE OF CORRECTION

PATENT NO. : 4,002,959

DATED : January 11, 1977

INVENTOR(S) : Fritz SCHADLICH et al

It is certified that error appears in the above-identified patent and that said Letters Patent are hereby corrected as shown below:

Claim 1, line 39, column 6, the word "second" should be -- sensed --

Signed and Sealed this

Sixteenth Day of May 1978

[SEAL]

Attest:

RUTH C. MASON
Attesting Officer

LUTRELLE F. PARKER
Acting Commissioner of Patents and Trademarks